May 14, 1957 L. J. FAGEOL 2,791,826
METHOD FOR CONSTRUCTION OF SELF-PROPELLED VEHICLES
Filed May 19, 1953 2 Sheets-Sheet 1

INVENTOR
Louis J. Fageol
BY Strauch, Nolan & Diggins
ATTORNEYS

May 14, 1957 L. J. FAGEOL 2,791,826
METHOD FOR CONSTRUCTION OF SELF-PROPELLED VEHICLES
Filed May 19, 1953 2 Sheets-Sheet 2

INVENTOR
LOUIS J. FAGEOL
BY Strauch, Nolan & Diggins
ATTORNEYS

United States Patent Office 2,791,826
Patented May 14, 1957

2,791,826

METHOD FOR CONSTRUCTION OF SELF-PROPELLED VEHICLES

Louis J. Fageol, Kent, Ohio, assignor to Twin Coach Company, Kent, Ohio, a corporation of Ohio Application May 19, 1953, Serial No. 356,081

1 Claim. (Cl. 29—469)

The present invention relates to self-propelled vehicles, and more particularly to methods of manufacturing low-cost, high-capacity, integral design, freight cargo trucks, and the like.

Heretofore a long-felt unfilled need and demand has existed in the trucking industry for low-cost high-capacity single unit vehicles. However, this need has not been met by prior vehicle designs, except for specially designed and manufactured units which high costs have rendered commercially impractical. Hence, this unfilled need of the trucking industry has continued to exist largely because of the fact that the potential commercial market for such vehicles is too limited to achieve sufficiently low production costs.

As a result of the failure of heavy-duty truck manufacturers to furnish vehicles to meet this need, the trucking industry has turned to extensive use of tractor-drawn semi-trailers and uses them in applications where straight, single unit vehicles of sufficient capacity are better adapted. The reason for this is that the practical market for semi-trailers is very broad as compared to markets for straight trucks. Semi-trailers are therefore produced in large volume at low unit production cost thereby giving them a competitive advantage over straight trucks of comparable capacity, prior to the present novel method of manufacture disclosed herein.

Due to high volume manufacture of trailers, trailer manufacturers have been able to devote considerable development work to improvement of trailer bodies. As a result, they have succeeded in engineering a considerable amount of weight out of trailer body units, thereby increasing pay load without sacrificing strength. However, this increased pay load capacity is largely off-set by the weight of the tractor required to pull the trailer. Moreover, the use of such trailers results in lower pay load capacity under most state laws regulating total gross vehicle weights.

Furthermore, combined tractor-trailers have excessive overall length for efficient use in many applications. Particularly, they are not sufficiently maneuverable for intracity deliveries, and necessary maneuvers in other close quarters. Also, they are, in general, a traffic hazard due to their excessive size, and particularly due to their tendency to jack-knife when suddenly stopped in normal highway operations.

It is accordingly the primary object of the present invention to provide novel methods for producing unitary light-weight, high-capacity, heavy-duty trucks of minimum overall length, having substantially all the advantages of a trailer unit, such as high-capacity, and all the inherent advantages of the single unitary vehicle, such as high maneuverability.

More specifically, it is a primary object of the present invention to provide novel methods of manufacturing whereby such vehicles may be manufactured at low cost, even in low volume production, from standard commercial components, without substantial modification of such components.

It is also an object of the invention to provide an improved single unit, light-weight, high-capacity vehicle of minimum overall length with improved efficiency and maneuverability.

It is a further object to provide such an improved vehicle which may be manufactured at low cost in relatively small volume.

These objects are accomplished by the utilization of standard, mass-produced semi-trailer or trailer bodies, mass-produced vehicle body structure sub-assemblies which are preferably trailer body sub-assemblies, and a mass-produced standard complete truck chassis in unique manufacturing methods to provide integral self-propelled vehicles. All of these components may be purchased from high volume producers who are able to realize the production savings inherent in mass production. In the novel method, these standard mass-produced, low cost components are converted by simple attachments into a unitary self-propelled, high capacity vehicle of the type set forth herein. Through the novel method of manufacture disclosed herein, I am able to utilize the inherent advantages of mass production to produce a complete unitary high capacity vehicle of this type for a relatively low volume market. Thus, this novel method substantially eliminates the inherent high cost of low volume production and makes it commercially possible to meet a previously existing and substantial need of the trucking industry heretofore not met.

In such conversions a standard truck chassis, having a frame with wheels, engine, controls, etc., attached thereto, is utilized to provide the basic supporting frame, wheels, power source and driver control mechanisms. A standard commercially available light-weight, heavy-duty box-like trailer body is mounted as a complete unit on a rearward part of the truck chassis by suitable means. Preferably, a slightly modified form of mass-produced, commercially available trailer sub-assembly comprising a curved, skinless forward end structure of a standard commercial trailer, semi-trailer, or bus body is mounted at the front end of the chassis to provide a driver's compartment. This latter sub-assembly need be only slightly modified to provide a pair of entrance doors, windows, head lights, and an air intake opening surrounding the radiator on the chassis in order to permit engine cooling.

For high capacity freight cargo carriers and the like incorporating the present invention, standard cargo type trailer body units with level floors are used. In this case, the body is mounted higher on the chassis so that it extends entirely above the top of the wheels. For furniture vans and other uses requiring lower floor height, standard trailer bodies having rear wheel wells are utilized, and the body is mounted lower on the chassis so that the level of the floor may be below the uppermost portions of the rear wheels.

Actual experience has shown that considerable savings in time and money are possible in the manufacture of high capacity trucks in accordance with the method of the present invention, as compared with the most efficient known prior manufacturing methods, particularly in the case of low volume production. Actual cost studies have indicated that:

1. The main body structure as taken from the mass-production trailer manufacturer's plant, assembled and ready for attachment for conversion into a unitary high capacity, heavy duty truck, can be presently purchased for less than half of the material cost alone of the conventional truck body structure.

2. The use of a standard mass-produced chassis, commercially available at low unit cost, to provide the basic frame for the vehicle and also its power plant results in a very substantial saving in production costs.

3. Less than 50% of the man hours necessary to build a heavy duty high capacity truck in accordance with conventional practices are required to complete a conversion of this truck in accordance with the novel method of the present invention.

4. As a result of these factors, a light-weight, high-capacity truck manufactured by the novel method disclosed herein can be sold on the retail market for at least 10 to 20% less than comparable vehicles produced according to prior known methods.

It is accordingly an additional object of the present invention to provide improved methods for the manufacture of high-capacity, light-weight trucks which effect the above stated economies.

Additional objects and advantages will become apparent as the description proceeds in connection with the accompanying drawings in which.

While for the purpose of disclosing the present invention only one type of vehicle is illustrated, namely, a general purpose cargo carrier, it is to be understood that the invention has equal application to other cargo carrying vehicles specifically designed for a variety of special uses, such as furniture vans, refrigerator trucks, field ambulances, and the like. In general, the modifications necessary to adapt the general purpose vehicles disclosed herein for such specialized use relate to the arangement of various accessories within the vehicle body, and these modifications form no part of the present invention.

Figure 1:
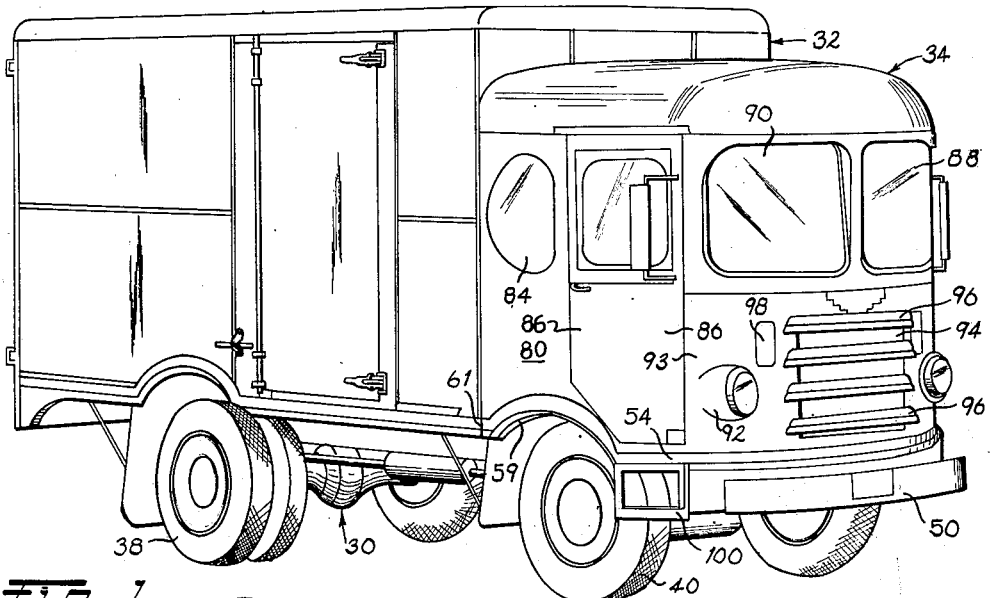
Figure 1 is a perspective view of an integral high-capacity self-propelled vehicle produced by the novel methods of the present invention.
Figure 2:
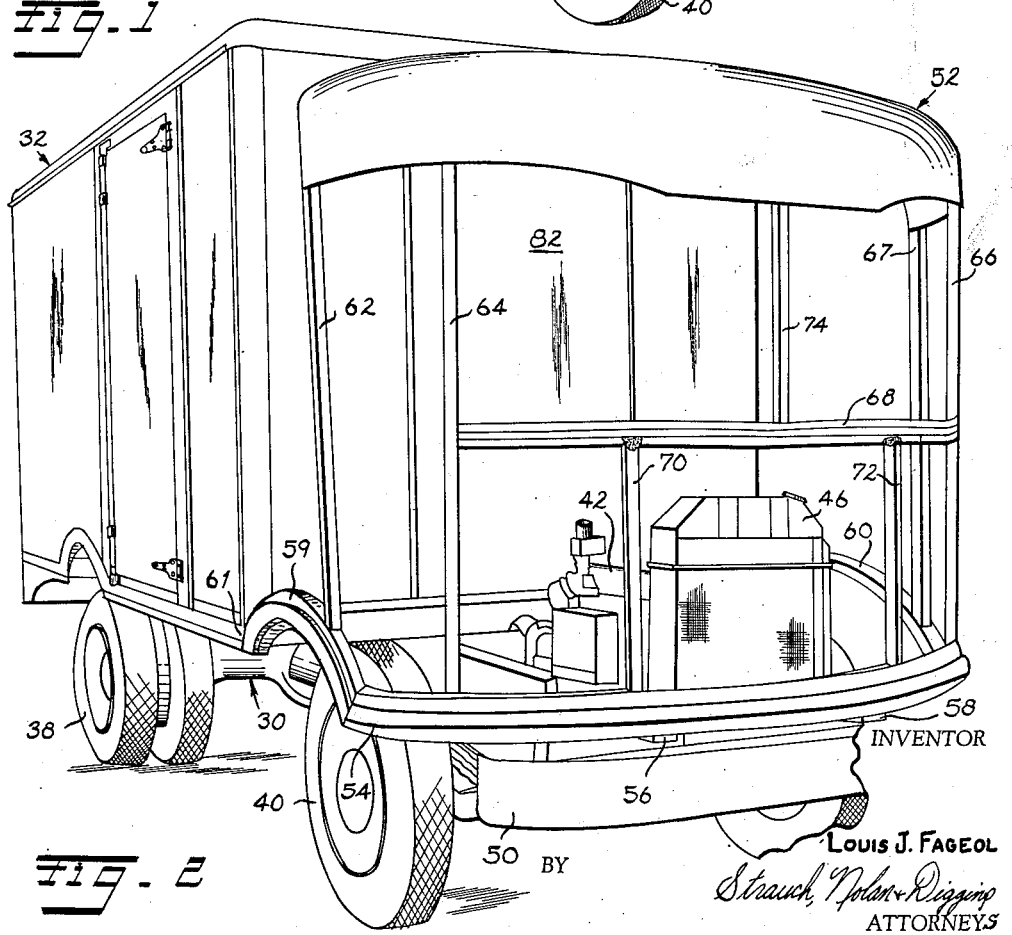
Figure 2 is a perspective view of the vehicle produced by the method of the present invention in the state of partial assembly, with windows, doors and sheet metal skin of the driver's compartment removed.
Figure 3:
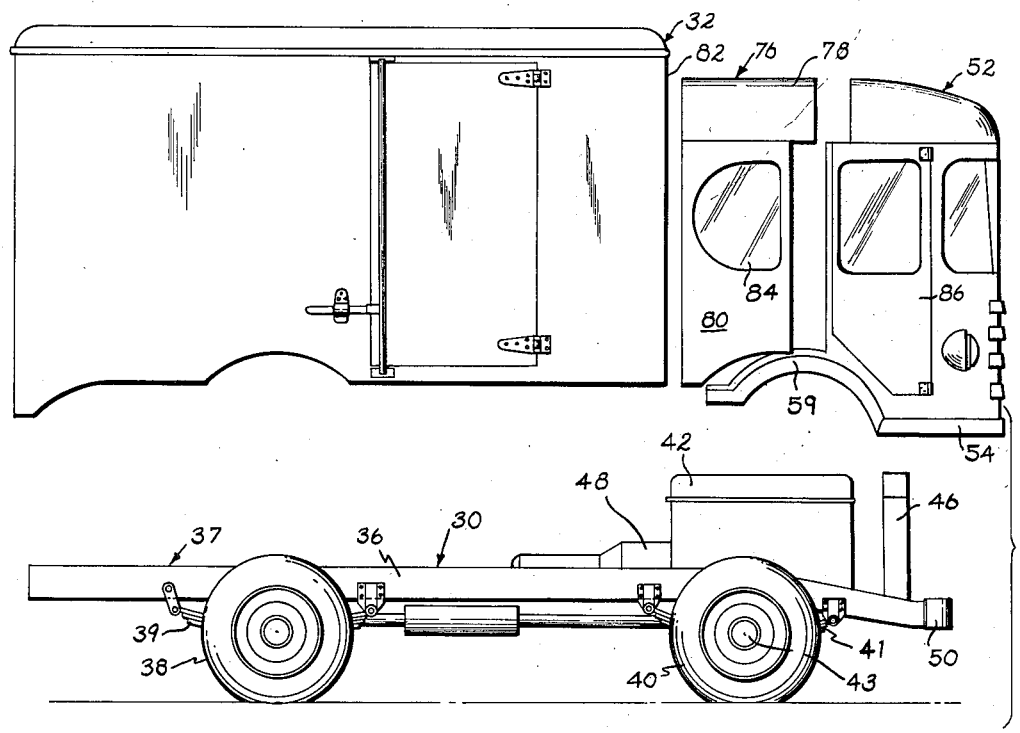
Figure 3 is an exploded side elevation view showing the basic components used in the novel method of the present invention.

Referring now more particularly to the cargo carrier illustrated in Figures 1, 2 and 3, the principal components of this vehicle are the chassis 30, the standard trailer body 32, and the driver compartment housing 34.

The vehicle produced by the novel method of the present invention includes a conventional standard mass-produced chassis 30 which is adapted for general purpose use and may be purchased at low-cost from a mass-producer. Such chassis comprises a frame 37 having a pair of main frame rails 36 with a pair of rear wheels 38, and a pair of steerable front wheels 40 suspended from frame 37 by means of springs 39 and 41, respectively. An engine 42 is mounted on the chassis frame, and conventional driving means, not shown connect the engine to the rear wheels 38 to drive the same. The chassis, includes the usual engine accessories, such as a radiator 46 and a transmission 48. For clarity, other conventional engine accessories have been omitted from Figure 3. A conventional bumper 50 is mounted on frame member 37 of chassis 30 when purchased.

A standard mass-produced complete light-weight trailer body 32, which is purchased as a unit from a low-cost mass-producer, is installed on chassis frame 37 by bolting, clamping or welding the trailer body unit 32 to the main frame rails 36 of the chassis 30.

A separate component 52, which preferably comprises a curved prefabricated skinless front-end sub-assembly from a conventional trailer, is mounted on the front of the chassis frame to provide the major portion of the driver compartment housing structure 34. This prefabricated trailer sub-assembly component 52 is purchased from a low-cost mass-producer of such units. A heavy U-shaped rail member 54 of the sub-assembly 52 is secured in any suitable fashion to the chassis frame at 56 and 58, rearwardly of bumper 50. The rail 54 is provided with arcuate wheel cover portions 59 and 60 secured to the front end of the trailer unit 32 at 61 by any suitable means, such as welding.

Trailer sub-assembly component 52 comprises a plurality of upright support members such as 62, 64, 66 and 67. Certain of the vertical support members in the original sub-assembly are removed, and a curved horizontal rail 68 is secured to vertical members 64 and 66 as shown in Figure 2. Shorter vertical members 70, 72 and 74 are secured to the frame as shown in Figure 2 to provide a pair of window frames, and an air intake opening for the engine radiator 46. It is to be understood that while the unit 52 is preferably a mass-produced trailer sub-assembly, a bus sub-assembly may be utilized and in some cases the component 52 may be custom-built to suit the requirements of a particular installation.

An adapter section 76, comprising a curved top 78 and two side panels 80, is secured between the rear of the sub-assembly component 52 and the forward wall 82 of the trailer body unit 32. Section 76 has a window 84 in each of the side panels 80, as shown in Figures 1 and 3, to permit greater visibility for the driver.

A pair of doors 86 are mounted in unit 52, one on each side of the driving compartment 34, as shown in Figures 1 and 3. The doors are supported in a suitable manner between adjacent vertical members 62, 64, 66 and 67. A pair of windshield window panels 88 and 90 are mounted on sub-assembly unit 52, as shown in Figure 1. A sheet metal skin 93 having an enlarged opening 94 to provide an air inlet to the engine radiator 46 is secured to sub-assembly unit 52, and a plurality of horizontally extending farings 96 are provided across the opening 94 to present an ornamental appearance. Ventilator vents 98, and headlights 92 are also provided on sub-assembly unit 52 in a conventional manner, as shown in Figure 1. A step rung 100 is secured to U-rail 54 below each of the doors 86 in order to permit easy access to the driver compartment 34.

Sub-assembly component 52 may be mounted on the chassis 30 before the trailer body unit 32 is mounted thereon, for example by securing U-rail 54 to the chassis frame 37 at points 56 and 58 as shown in Figure 1. If desired, driver housing compartment 34 may then be completed before the trailer body 32 is mounted on the chassis 30. After the trailer body unit 32 has been mounted on chassis frame 37, the driver compartment housing 34 may be connected in any suitable manner to the front end wall 82 of the trailer body unit 32. The front end wall 82 of trailer body unit 32 is preferably utilized as the rear wall of the driver compartment housing 34.

The driver compartment 34 is equipped with seats, instrument panel, steering wheel and other vehicle and engine operating controls. In the embodiment here shown, the driver's seat is mounted forwardly on the chassis adjacent the engine. Brake and clutch pedals, and steering wheel are moved forward adjacent the front end of section 52 and they are connected through suitable linkages to the existing control members provided on the standard chassis 30, with a minimum of modification.

Whenever necessary, the front axle 43 and steerable front wheels 40 thereon may be repositioned on the chassis 30 to correspond with the desired weight distribution for front and rear axles.

Figure 4:
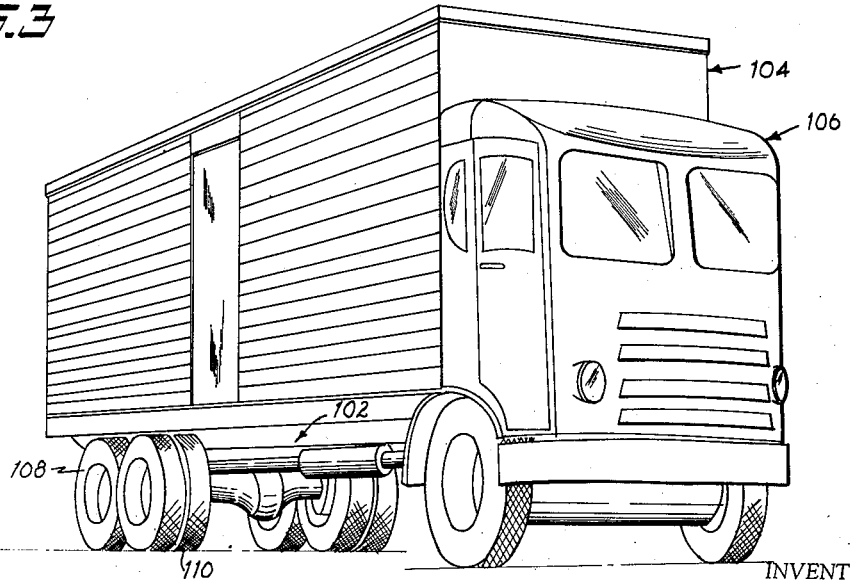
Figure 4 is a perspective view of a modification of the truck-type vehicle produced by the novel methods of the present invention, the modification having dual rear wheels and a larger trailer body unit with a straight through floor.

Referring now more particularly to the modification illustrated in Figure 4, the principal components of the vehicle shown here are the chassis 102, the trailer body unit 104 and the driving compartment 106.

Chassis 102 is a conventional standard mass-produced chassis purchased as a unit. It is substantially identical to chassis 30 shown in Figure 3 except that it is larger and has dual rear wheels 108 and 110, to enable the vehicle to carry larger loads. Trailer body 104 here shown is a large straight through-floor type, which is purchased as a complete unit at low cost from a mass-producer. Body 104 is mounted on chassis 102, by suitable means, so that its floor lies above the dual rear wheels 108 and 110.

The method of producing the larger self-propelled vehicle shown in Figure 4 is substantially the same as the above described novel method used in producing the smaller vehicle shown in Figures 1 to 3. However, in the case of the larger vehicles, particularly where the wheel base required is in etxcess of thirty feet, a slight modification in the above-described method may be desirable. To produce a larger vehicle, the main chassis frame rails of the standard chassis 102 are dissected between the front and rear wheel axles to divide the chassis into two parts. Suitable means, such as a pair of channel sections, is then welded, or otherwise secured, at each end to the cut ends of the chassis frame rails. Instead of channels, a truss-like unit may be used. The original drive shaft must be replaced with a shaft of suitable length. This results in an integral chassis having an elongated wheel base, so that a larger trailer unit may be mounted thereon. The modification of the chassis in this manner by inserting the extra elongating means into the chassis frame is a relatively simple and inexpensive operation and results in considerable savings. The use of this latter step provides a simple means whereby a shorter, conventional size chassis which is mass-produced in high volume at low cost may be used instead of a custom built chassis unit which is not produced in high volume and hence has a higher unit cost.

This novel method of construction of unitary cargo vehicles of this type is not confined to the use of a chassis wherein the engine is vertically mounted thereon as schematically shown in Figure 3. The novel methods of manufacture described herein can also be used with a chassis having an engine mounted thereon in underslung fashion in a manner similar to that disclosed in copending application Serial No. 237,210, filed July 17, 1951, now abandoned.

As stated previously, it is a feature of this invention that the cargo vehicle produced by the novel method can be made from standard mass-produced parts which may be purchased on the open market at low cost. Significant advantages to be derived from the present invention are due in large measure to the development of a novel method for converting such low cost widely available units with a minimum of modification for use in a self-propelled vehicle which retains the essential inherent advantages of trailers and of unitary truck-type vehicles.

It will be apparent from the foregoing that the novel method of the present invention enables the creation and production of a low cost, high capacity, light weight cargo vehicle meeting special operational problems and needs of the trucking industry not met heretofore by heavy vehicle producers. Particularly, it will be apparent that the novel methods permit production of such vehicles having increased efficiency at a production cost and market price substantially lower than that achievable by any prior known method of construction.

The invention herein disclosed may be embodied in other specific forms without departing from the spirit or essential characteristics thereof. The present embodiments are therefore to be considered in all respects as illustrative and not restrictive. The scope of the invention is to be indicated by the appended claim rather than by the foregoing description, and all changes which come within the meaning and range of equivalency of the claim are therefore intended to be embraced therein.

What is claimed and desired to be secured by United States Letters Patent is:

A method of converting standard mass-produced trailer components and a standard mass-produced vehicle chassis having a frame with rear drive wheels, steerable front wheels and a power plant thereon into a unitary self-propelled vehicle, comprising the steps of dissecting said chassis frame between front and rear axles thereby dividing the chassis into two parts, securing a relatively rigid means to the cut ends of the two parts of said dissected chassis thereby reforming an integral chassis having a wheel base of increased length, mounting a standard mass-produced box-like trailer body on said chassis frame adjacent said rear drive wheels, mounting a mass-produced trailer front end sub-assembly adjacent said steerable front wheels, and connecting said trailer front end sub-assembly to one end of said box-like body thereby providing a driver housing compartment.

References Cited in the file of this patent

UNITED STATES PATENTS

| | | |
|---|---|---|
| 1,750,130 | Romine | Mar. 11, 1930 |
| 1,772,735 | Romine | Aug. 12, 1930 |
| 1,876,759 | Romine | Sept. 13, 1932 |
| 2,291,626 | Huber | Aug. 4, 1942 |
| 2,540,859 | Birkin | Feb. 6, 1951 |
| 2,544,525 | Cadwaller | Mar. 6, 1951 |
| 2,561,098 | Cole | July 17, 1951 |